July 15, 1952 R. M. ZOOK 2,603,547
STORAGE CABINET
Filed Nov. 22, 1946 6 Sheets-Sheet 1
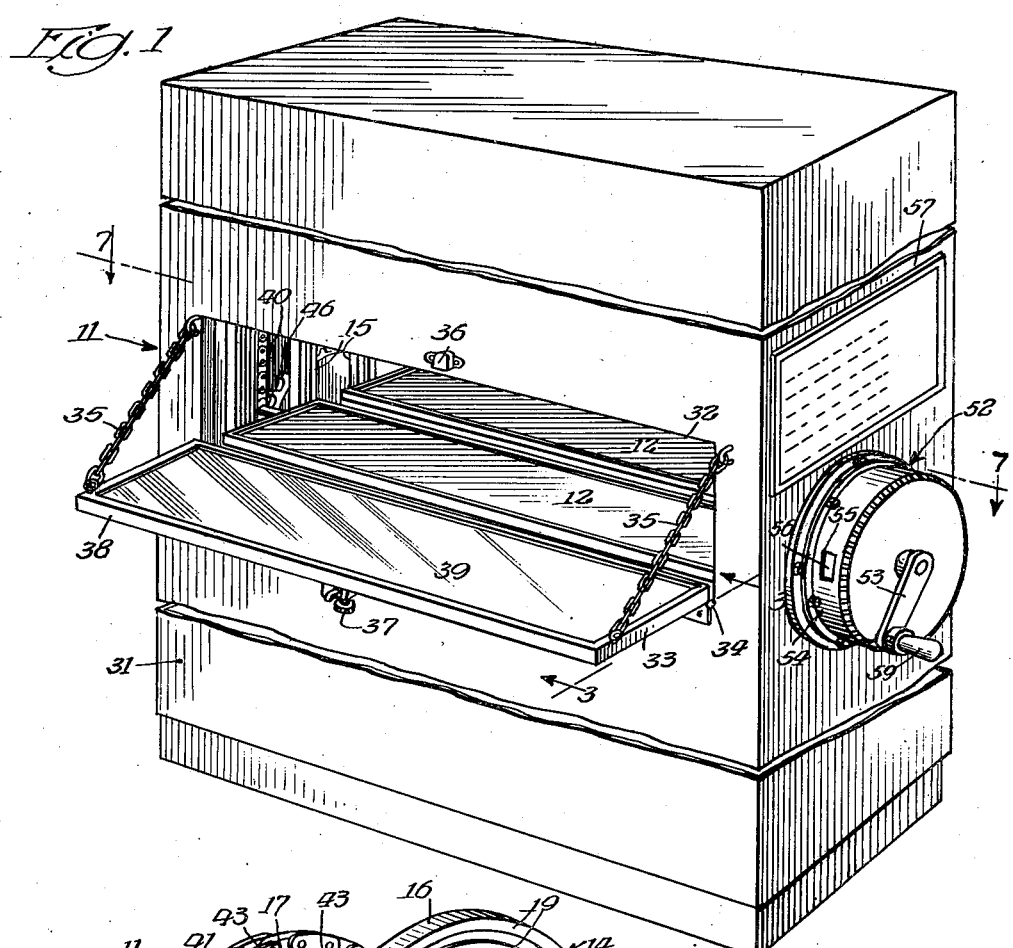
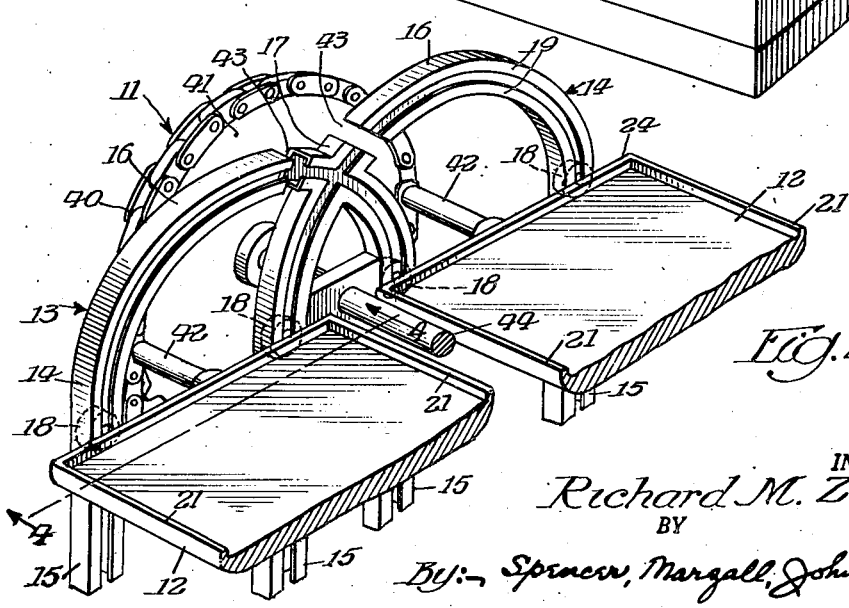
INVENTOR.
Richard M. Zook
BY
Spencer, Margall, Johnston & Cook
Attys

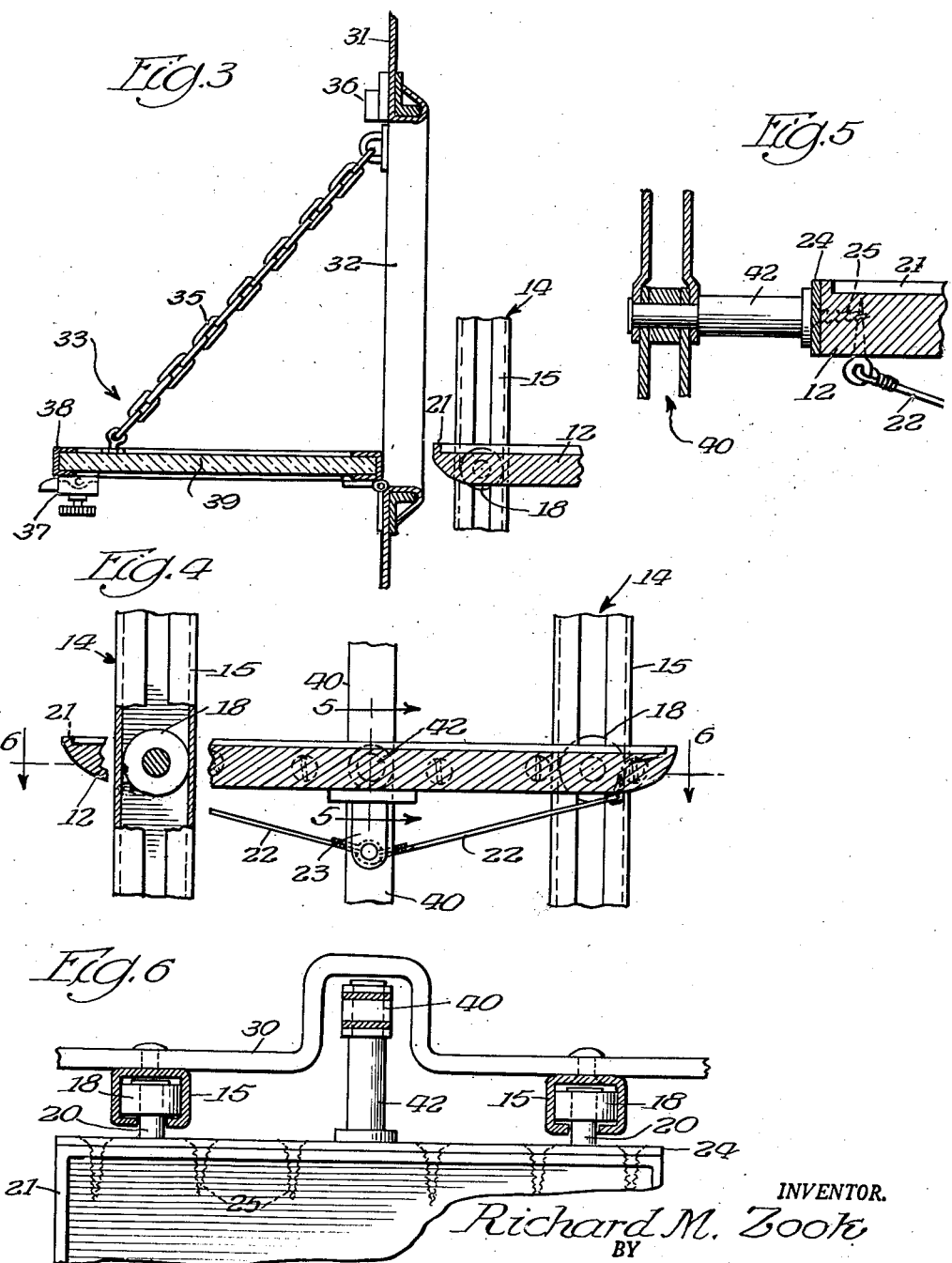

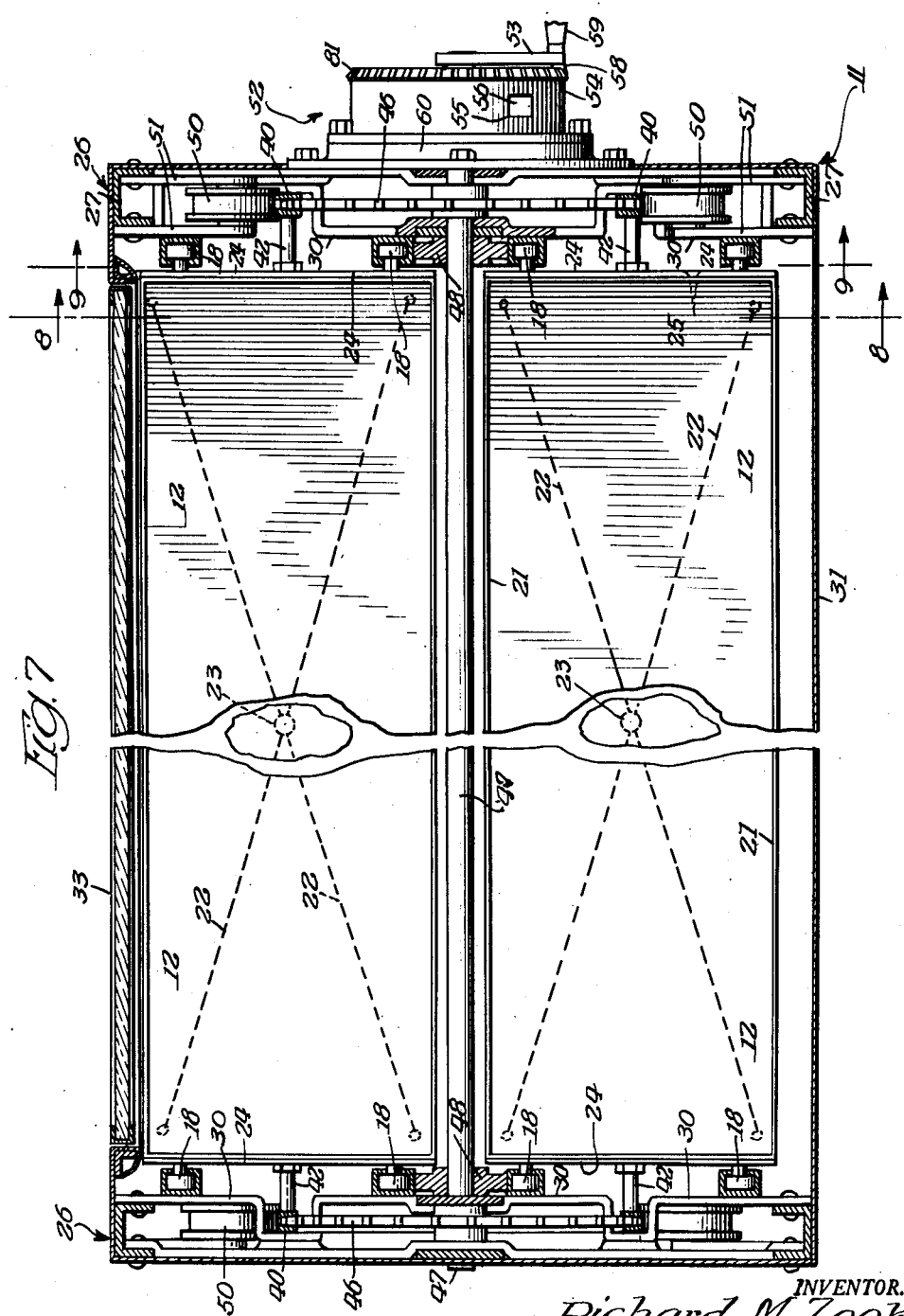

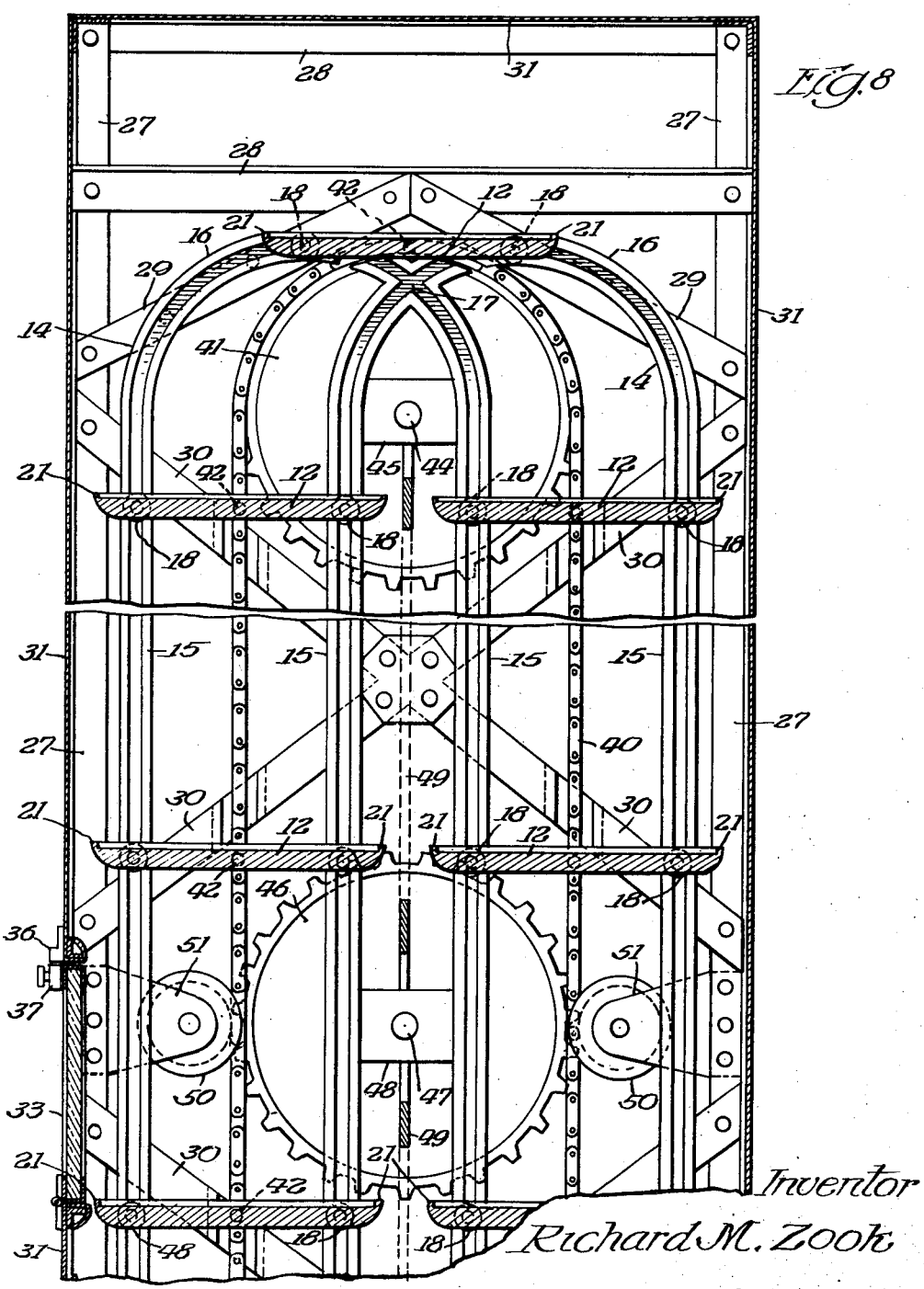

July 15, 1952 R. M. ZOOK 2,603,547
STORAGE CABINET
Filed Nov. 22, 1946 6 Sheets-Sheet 5

INVENTOR.
Richard M Zook
BY
Spencer, Marzall, Johnston & Cook
Attys

July 15, 1952  R. M. ZOOK  2,603,547
STORAGE CABINET
Filed Nov. 22, 1946  6 Sheets-Sheet 6
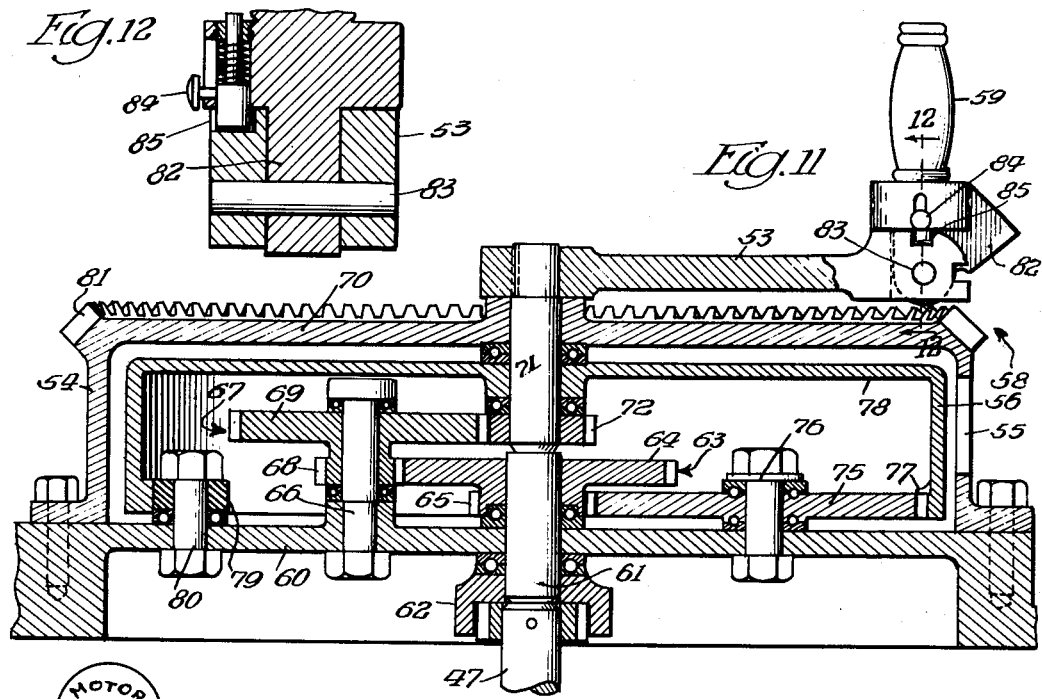
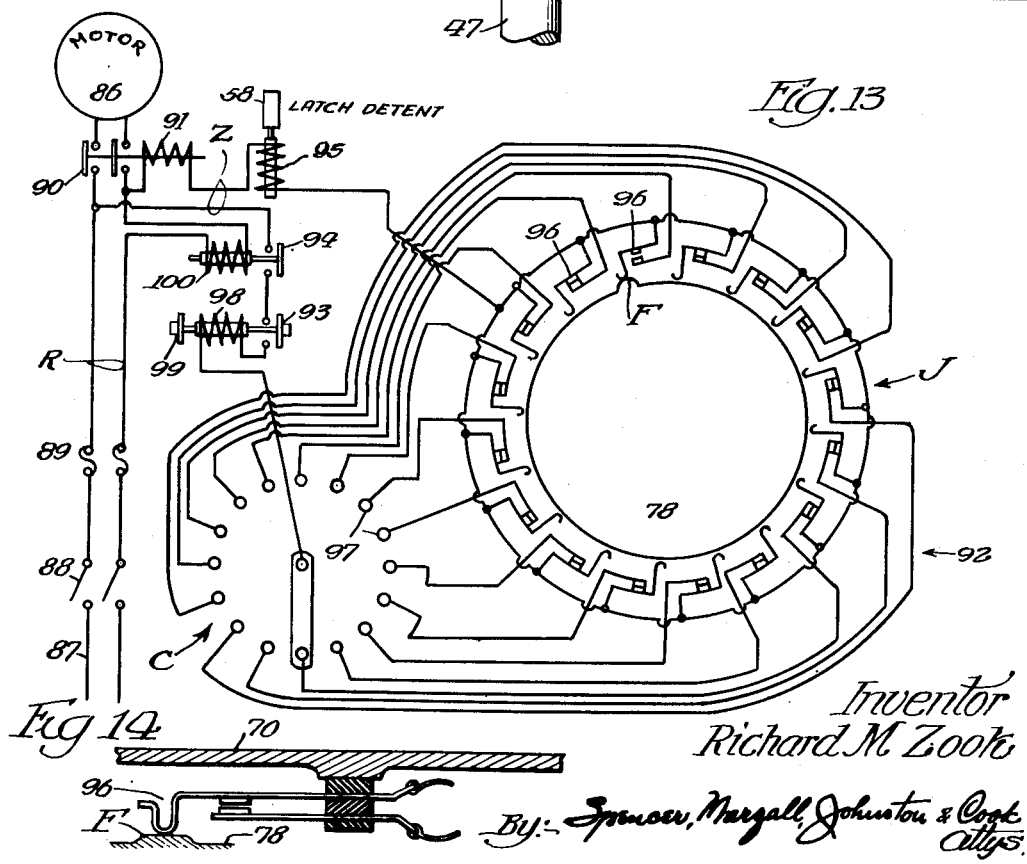
Inventor
Richard M. Zook
By: Spencer, Margall, Johnston & Cook
Attys.

Patented July 15, 1952

2,603,547

UNITED STATES PATENT OFFICE 2,603,547

STORAGE CABINET

Richard M. Zook, Beverly Hills, Calif.

Application November 22, 1946, Serial No. 711,552

20 Claims. (Cl. 312—223)

The present invention relates in general to storage equipment, and has more particular reference to a movable shelf-like structure having new and improved means operable to present the shelves selectively in loading and unloading position in the structure.

An important object of the present invention is to provide a neat, compact, serviceable, and easily operated storage device, including shiftable support members or shelves, and embodying mechanism for moving the support members at will, whereby articles or objects may be stored in the device on said support members, and the support members may be positioned successively, alternately, or selectively at loading or discharge stations, to permit storable articles or objects to be loaded upon and to be dispensed from the support members or shelves as and when the same are positioned in loading or dispensing position; a further object being to enclose the shiftable shelf mechanism, embodying the present invention, in a suitable cabinet having an opening or openings at the loading and discharge station or stations, and through which storable objects may be loaded into or dispensed from the storage device, when the shelves are in loading or dispensing position opposite said opening or openings, the support members or shelves and objects stored thereon being inaccessible from outside of the cabinet or housing, save when in loading or dispensing position in said openings.

Another important object is to provide storage and dispensing apparatus, comprising support members or shelves and means to support the same for movement in a shelf circulating path, said means serving to maintain the support members or shelves in article supporting position at all times, whereby supportable articles may be carried on and by said supporting members in every position thereof in said circulating path; a further object being to constitute said shelves as horizontal trays, each guided on a pair of overlapping, continuous tracks by means of spaced-apart track engaging members on the shelves, whereby each shelf, in traveling the overlapping tracks, may be maintained thereby in parallel relationship with respect to all of the other shelves.

A further object is to provide overlapping tracks, for shelf guiding purposes, comprising identical tracks having parallel, spaced-apart sides and curved end portions interconnecting the sides, said overlapping tracks lying in a common plane or zone and having intersecting portions at the opposite curved ends of the trackways, corresponding portions of each trackway being spaced apart a distance equal to the spacement of the track engaging, shelf guiding members, whereby shelves traveling said overlapping trackways may be at all times supported in position parallel with respect to the other shelves.

Another important object is to arrange the overlapping trackways in a vertical plane, whereby the shelves may be supported horizontally.

Another object is to provide means for supporting and moving the shelves on the tracks, comprising a flexible, endless driving member, such as a chain, supported on suitable driving and guiding members, such as chain sprockets, and mounted for operation preferably in a plane offset with respect to the plane of the overlapping guide tracks and on the side thereof remote from said shelves, the shelves being drivingly connected with said flexible drive member by means of driving pins on the shelves, and extending thence to, and being connected with, the flexible drive member, whereby movement of the member in one direction or the other may draw the shelves along the trackways; a further object being to interrupt the trackways, as at the ends thereof, to permit passage therethrough of said driving pins.

Another important object is to provide simple and inexpensive shelf driving means for track mounted shelves, comprising a flexible driving member, such as an endless driving chain, suitably supported as on spaced sprockets, there being a flexible driving member at and connected to each of the opposite track mounted sides or ends of the shelves, including drive shaft means for driving at least one sprocket of each flexible member, said drive shaft means extending medially of and within the circulating path of the shelves.

Another important object is to provide suitable support frame means for mounting the trackways and also the flexible driving member and its support sprockets in relatively offset position, while allowing for the driving movement of the shelf driving means, including the shelf driving pins, without interference with said supporting frame means.

Another important object resides in providing suitable means for journaling the sprocket driving shaft on the track supporting frames, at the opposite ends of the structure, to aid in rigidifying the same; a further object being to provide means for rigidifying and adequately supporting those portions of the overlapping track structures which extend in alinement with the chain driving and guiding sprockets.

Another important object is to provide easily operated and controlled means for turning the chain sprocket drive shaft; a further object being to provide manually operable crank means for turning the drive shaft; a still further object being to provide reduction gear means to facilitate the turning of the drive shaft, by means of a manually operable hand crank exposed outwardly of the housing in which the storage mechanism is enclosed.

Another object is to provide index means in association with the drive mechanism for the purpose of indicating the position of the several support members or shelves in the storage device, this facility being particularly advantageous where the enclosing housing is made of opaque material.

A further object is to provide conveniently accessible catalog means for indicating the nature of the articles or objects stored on each shelf; a further object being to provide catalog means that may be easily correlated with the indexing means on the drive mechanism.

Another important object is to provide storage and dispensing apparatus of the character mentioned, which may be operated by suitable driving motor means, preferably electrically energized, and to provide suitable pushbutton control mechanism for selectively controlling the driving means to present any desired support member or shelf in shelf loading or article dispensing position.

Another important object is to provide storage equipment of the character mentioned, in which the housing may be made of transparent material, such as glass, for the purpose of displaying stored articles or objects to view outwardly of the enclosing housing; a further object being to provide apparatus wherein the enclosing housing may comprise insulation, and may include refrigerating or cooling equipment, or may be associated with heating means for maintaining the stored objects at a desired storage temperature.

Another important object is to provide storage apparatus of the character mentioned, including an enclosing cabinet provided with a loading or dispensing opening, having closure means adapted to form a convenient, outwardly projecting shelf when open, to facilitate the loading of the apparatus or the dispensation therefrom of stored objects; a further object being to form said door as a transparent panel, through which stored objects on the shelf in loading or dispensing position may be viewed through said transparent shelf door from outwardly of the enclosing cabinet.

Among the other important objects is to provide storage apparatus of the character mentioned, including shiftable support members and operable means to shift the same, which apparatus may be assembled in any desired or suitable cabinet structure, or may be set up for uninclosed use, if desired, depending upon the character of required storage facility to be provided by the structure, whereby apparatus embodying the present invention may be used for domestic storage purposes, as in the home; for mercantile storage, as in wholesale or retail stores, or in warehouses; for the refrigerated storage of merchandise, such as perishable foods; for heated storage purposes, as in connection with the manufacture or sale of bakery products; for the storage of books, as in libraries; and for numerous other storage and dispensing purposes, the present invention affording storage facilities of unusually compact, space saving character, resulting from the structure and arrangement which allows all of the stored articles or objects to be brought to a single delivery station, thereby eliminating the necessity of providing separate access space to each support member or shelf, a single access space only being required for all shelves.

A further obvious utility results from the possibility of providing separate loading and delivery stations, if desired; or a plurality of loading and delivery stations may be provided where the apparatus is of large or extended size, as, for example, storage apparatus of a size extending through several floor levels of a building, and wherein a loading and dispensing station is, or may be, provided at each floor level, the invention being not necessarily limited to a single loading and discharge station, nor to separate, single loading and discharge stations.

Still another obvious utility of apparatus embodying the present invention resides in the possibility of incorporating the invention in automatic merchandise dispensing machines by applying suitable automatically operable control mechanism, such as coin control apparatus, for controlling the operation of the storage apparatus.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of a form of storage apparatus embodying the present invention;

Fig. 2 is a perspective view showing portions of the storage apparatus;

Fig. 3 is a sectional view taken substantially along the line 3—3 in Fig. 1;

Fig. 4 is a sectional view taken substantially along the line 4—4 in Fig. 2;

Figure 9:
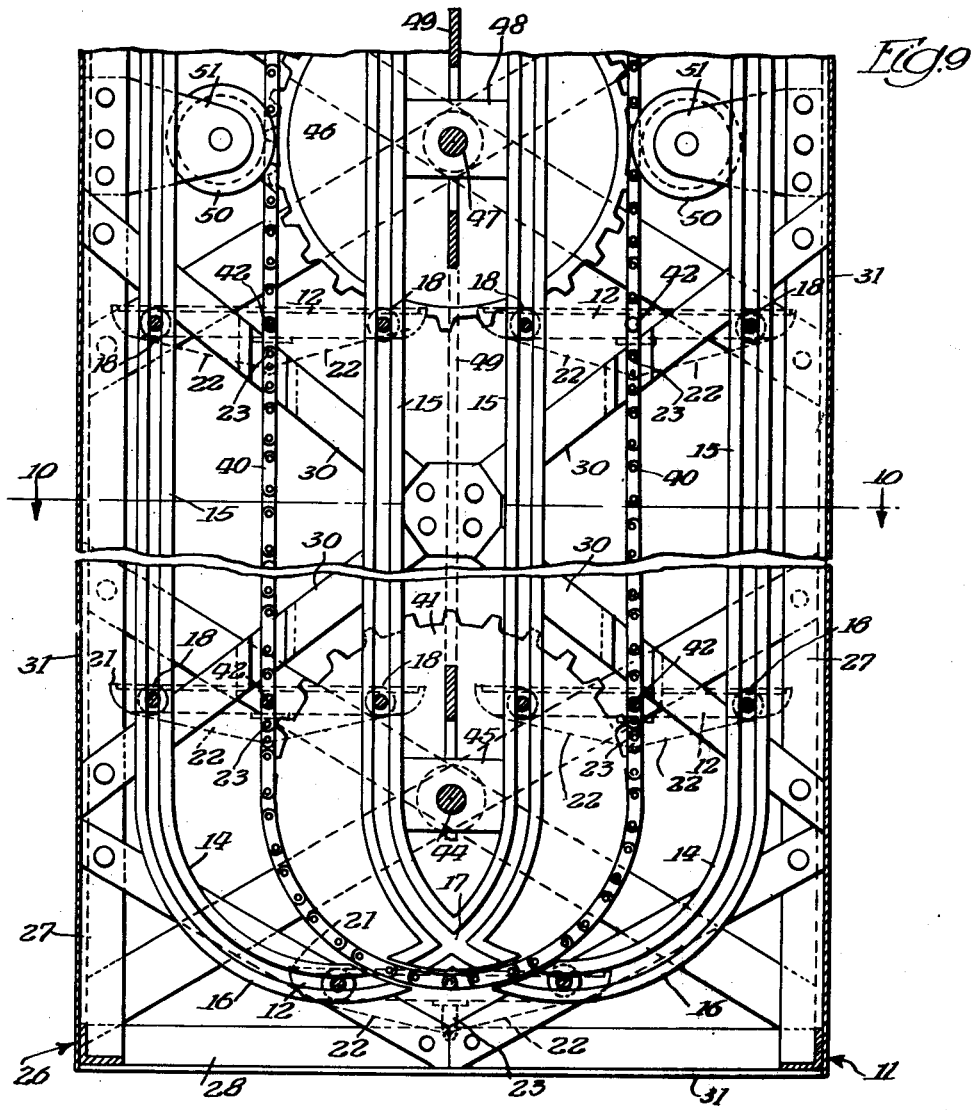
Figure 10:
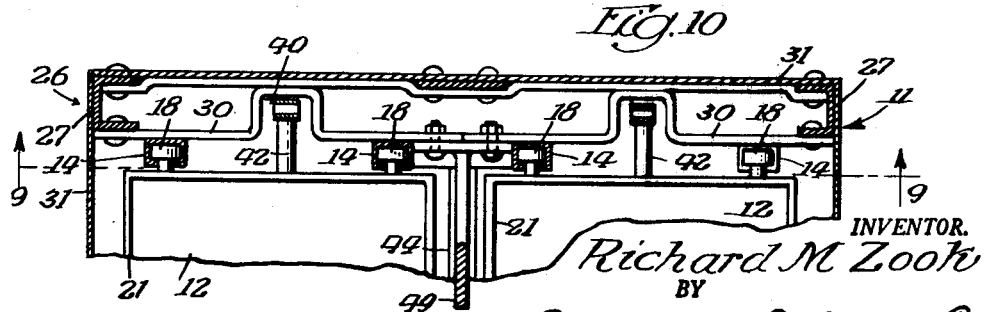

Figs. 5 and 6 are sectional views, respectively taken substantially along the lines 5—5 and 6—6 in Fig. 4;

Fig. 7 is a sectional view taken substantially along the line 7—7 in Fig. 1;

Figs. 8 and 9 are sectional views, respectively taken substantially along the lines 8—8 and 9—9 in Fig. 7;

Fig. 10 is a sectional view taken substantially along the line 10—10 in Fig. 9;

Fig. 11 is a sectional view through a manually operable power multiplying mechanism for actuating the apparatus;

Fig. 12 is a sectional view along line 12—12 in Fig. 11;

Fig. 13 is a diagram of electrical connections for controlling the operation of the apparatus where electrical means for operating the same is provided; and Fig. 14 is a sectional view of switch means of a sort adapted for use in the system shown in Fig. 13.

To illustrate the invention, the drawings show storage apparatus 11, which essentially comprises a plurality of storage support members 12 adapted to receive and support articles to be stored thereon. The support members 12 may conveniently take the form of flat, horizontal shelves, although it will be obvious that the support members may incorporate any other desired configuration for the better reception and support of the articles stored thereon. The apparatus also comprises means for supporting the members 12 for movement in spaced-apart relationship in a circuitous path, the apparatus preferably including means for holding the shelves stationary in any selected position in the path circuit. To this end, the members 12 may be mounted for movement on a suitable track system 13 which, as shown, may comprise a pair of overlapping, circuitous or endless tracks 14 in spaced-apart relation, as at the opposite ends of the members 12. Each of the members 12, thus, may be supported on a pair of overlapping tracks 14 at each of the opposite ends of the members. Preferably, the spaced-apart track pairs have identical configuration, and the tracks of each overlapping track pair 14, likewise, preferably have identical configuration so that all of the corresponding portions of the tracks of a track pair are equally spaced apart. Each track of a track pair, also, may have any convenient configuration, but each track preferably comprises a pair of spaced-apart, straight sections 15 and rounded, preferably semi-circular portions 16 interconnecting the straight sections 15 at the opposite ends thereof to form an endless trackway. A pair of such trackways may be arranged preferably in a common plane and in overlapping relationship with the semi-circular end portions intersecting and mutually crossing, as at 17. The tracks are sufficiently overlapped to allow the inwardly facing portions of members 12 on one side of the structure, in traveling said side, to adequately clear the inwardly facing sides of members 12 mounted on the other side of the structure, during movement therealong.

The support members 12 may be mounted on the track structure in any suitable or preferred fashion, as by means of rollers 18 mounted on the members 12 in position to ridingly engage the tracks, there being a roller on each member 12 for each of the trackways, and said rollers at each end of a member 12 being spaced apart a distance equal to the spacement between corresponding portions of the tracks of the cooperating track pair. It will be seen from the foregoing that the members 12, so mounted on the track system, may move thereon in endless succession in a circuitous path determined by the configuration of the tracks 14. To this end, the support members 12 may traverse the track portions 15 forming one side of the track system, and may then traverse the interconnecting track portions 16 and be thus delivered to the track portions 15 forming the other side of the track system, each member 12 being maintained at all times in parallelism with all of the other support members. Ordinarily, the tracks may be mounted in position thus to support the members 12 as shelves maintained at all times in horizontal, or other desirably inclined, position.

Suitable means is provided for moving the members 12 successively along the circuitous track system, while maintaining a desired, preferably equal spacement of the members 12 on the trackway.

The tracks themselves may conveniently comprise preferably sheet metal channel members of generally U-shaped sectional configuration; and, if desired, the spaced edges of the channel members may be inwardly flanged as at 19, to aid in retaining the rollers 18 in operating position. The rollers 18 may be of any suitable or preferred construction and may incorporate roller bearings, if desired, the rollers being supported on axle pins 20 fastened to the support members 12. The support members 12 may incorporate any convenient or preferred configuration adapted to the reception and support of articles to be stored thereon. As shown, the members 12 comprise flat shelf members, and they are preferably provided with means forming upstanding marginal flanges or beads 21 at the marginal edges of the shelf members, to aid in retaining stored objects thereon.

The support members 12 may, of course, be formed of any convenient material, including sheet metal, and may be braced and rigidified in any suitable fashion where the strength of the material employed and the length or width of the members require rigidifying, bracing means. In this connection, where the structure embodies shelf members of unusual or excessive length, the shelves may be braced by suitable strut means, such as diagonal strut members 22, mounted as at the end of a dependent pedestal 23 extending downwardly of the medial portions of a shelf, the members 22 extending oppositely from the dependent pedestal to, and being anchored on, the shelf member at the opposite ends thereof.

As shown, the shelf members 12 may conveniently comprise wooden boards having metal mounting strips 24 secured, as by means of suitable fastening members 25, at the opposite ends of the shelves, said mounting strips 24 carrying the roller support pins 20 thereon in position to carry the rollers 18 at the opposite ends of the shelves.

The spaced-apart track means 13 at the opposite ends of the structure may be supported and maintained in spaced relationship by attaching the same in a suitable support structure which, as shown in the illustrated embodiment, comprises end frames 26 built of channel members 27 and angle irons 28, suitably secured together to form preferably rectangular mounting frames at the opposite ends of the structure. These frames carry transversely and preferably diagonally extending support bars 29 and 30, upon which the track structures are mounted in operative position to support the members 12 therebetween, said transverse members 29 and 30 serving also to rigidify the end frames 26, which, in turn, may be supported rigidly in spaced-apart relationship by any suitable support means, such as frame members extending therebetween, or by anchoring the same to the building in which the storage structure is erected. Where the storage apparatus is enclosed in a suitable housing, the support structure, including the end frames 26 and interconnecting spacing and bracing members, may serve, also, to carry panel means 31 to form an enclosed housing around the storage mechanism, the panel means 31, in the illustrated embodiment, comprising sheet metal members applied to the end frames 26 and the interconnected frame spacing and bracing structure. It will be apparent, however, that any suitable sheathing material, such as wood, or glass, or other transparent material where visibility of the stored contents may be desirable, may, of course, be employed to enclose the structure.

The enclosing housing, of course, may be provided with one or more openings giving access to the support members or shelves 12, for the purpose of allowing the same to be loaded with articles or objects to be stored, and to permit stored articles to be delivered or dispensed from the storage structure. To this end, as shown in the drawings, the enclosing housing may be provided with an opening 32 and a door 33, or other suitable closure may be provided for the opening. As shown, the opening 32 comprises a single loading and dispensing station, although it will be apparent that separate station openings may be provided for loading objects into the structure and for dispensing the same therefrom. Likewise, it will be apparent that several loading and dispensing openings may be provided, if desired. As shown, however, the opening 32 extends substantially throughout the entire width of the apparatus, giving access readily through the opening to all parts of a member 12 when the same is in alinement with the opening. It is preferable that the opening 32, particularly at a loading station, have limited dimensions in the direction of operating movement of the support members 12, in order to prevent the loading of objects on a shelf to a height thereon which will interfere with an adjacent shelf as the same or the loaded shelf passes around the curved track portions, the vertical spacement of the shelves at such times being substantially less than the spacement of the shelves when the same are supported on the straight track portions.

The closure member 33 may be of any suitable or preferred form and, as shown, may comprise a panel hinged for swinging movement, as at 34, at and along the lower edge of the opening 32, whereby the closure member may form a loading or delivery shelf when in open position, suitable support means, such as the flexible chains 35, or other bracing or supporting means, being provided to support the closure member in open, shelf-forming position. Suitable latching means, such as a keeper 36, on the housing, and a preferably manually operable latch member 37 on the closure member, may be provided for securing the same in closed position. The closure member itself may be made of any suitable material, although the same preferably comprises a marginal frame 38 and a central panel 39 of glass or other transparent material permitting inspection, from outwardly of the apparatus, of articles stored on a shelf in position registered with the loading or discharge opening 32, while the closure member 33 is in closed position.

It will be apparent, of course, that the enclosing housing may be made sufficiently large to accommodate heating or cooling elements, or drying or humidifying means, within the housing, in order to provide for the maintenance therein of desired storage temperature and humidity conditions; and, of course, the housing may be insulated against heat transfer therethrough, if desired.

Any suitable driving means may be employed in order to move the support members 12 in the circuitous path determined by the track means 13. As shown, said means may conveniently comprise an endless chain 40 carried on spaced sprockets 41 and thereby guided in a path preferably outwardly of the ends of the shelves and outwardly of the track means 14, there being a preferably endless driving member 40 at each of the opposite ends of the structure, and said driving members extending in alinement with the path of movement of the corresponding portions of the members 12 in traveling the circuitous pathway thereof. Where the support members 12 comprise shelves, the driving members 40 are preferably located in alinement with the path of movement of the medial portions of the shelves. It will be seen that the members 41 are necessarily mounted at and in registration with the overlapping curved portions of the track members 14, the members 12 being drivingly connected with the members 40 in spaced relationship therealong by means of driving pins 42. These pins 42 may be mounted on the members 12 in any, preferably rigid, fashion, as by mounting the same medially on the end strips 24, said pins extending to and being connected on the driving member 40, as shown more particularly in Fig. 5 of the drawings.

It will be seen that these driving pins 42, as the members 12 traverse the curved track portions 16, must pass through said curved track portions, which are interrupted, as at 43, to accommodate the passage of the pins 42 therethrough. Because of the necessity of thus interrupting the curved portions of the track members 14, it will be seen that the intersecting track portions are supported only on the frame members 30, and that the intersecting track portions in registration with the adjacent guide member 41 are otherwise unsupported. The members 41 are preferably supported on shafts 44 which may be journaled in the end frames, and also in bearings 45 mounted on the unsupported, overlapping track portions, whereby the shafts 44 may serve to connect and brace said unsupported track portions on the end frames 26. Since the members 41, on one side of the structure, are in axial alinement with the corresponding members 41 at the other side of the structure, the shafts 44 may extend longitudinally of the structure and thereby serve not only to brace and space the unsupported, overlapping track portions, but also to aid in bracing and spacing the end frames 26. To this end, the overlapping tracks are preferably overlapped to an extent sufficient to allow the members 12, in traveling the opposite sides of the track, to clear the shafts 44.

Any suitable means may be used to drive the member 40, to thereby move the support members 12 on the tracks 14. To this end, suitable driving means may be provided for turning one or more of the shafts 44. As shown, however, the driving members 40 at opposite ends of the structure may each be drivingly connected with a drive sprocket 46, the sprockets 46 at opposite ends of the structure being preferably mounted on a common driving shaft 47 suitably journaled in bearing means 48, which may be mounted on and supported by the track structure, so that the so journaled shaft 47, through its bearing connection with the track system, may aid in rigidifying and strengthening the entire structure. Longitudinally, and preferably diagonally, extending bracing members 49 also may be disposed, as shown in dotted lines in Fig. 8, in the clearance space between facing ends of the shelf members 12, said members 49 extending between opposite ends of the frame structure and being conveniently secured to the shaft bearings 45 and 48, to thus rigidify the track structure and its supporting frame.

The driving sprockets 46 and the guide sprockets 41 are preferably of equal size, so that each drive sprocket 46 may drivingly engage the spaced-apart stretches of its associated member 40; and to aid in maintaining the flexible members 40 in driving engagement with the sprockets 46, backing rollers 50, suitably journaled on mounting brackets 51, may be provided, said brackets being, in turn, secured on the end frame structures 26 in position supporting the backing rollers against the peripheries of the sprockets 46, to hold the members 40 between the sprockets and rollers and at all times in driving engagement with the sprockets.

Any suitable or preferred means 52, of course, may be provided for turning the shaft 47, or for otherwise moving the flexible drive members 40 on the guide members 41 and for holding the same in any desired shelf supporting position in the structure. As shown more particularly in Figs. 1, 7, and 11, the driving means 52 may comprise a power multiplying gear mechanism suitably mounted on the support frame 26 at one end of the structure in position driving connected with the shaft 47, and provided with a hand crank 53 for manual operation. The mechanism 52 may be mounted outwardly of the storage device and enclosed in a suitable housing 54, if desired. The housing 54 also may be provided with a window opening 55 to reveal therethrough the surfaces of an index wheel 56 drivingly associated with the gear mechanism and suitably marked to indicate the position of the shelves or support members 12 in the structure. To this end, an arbitrary identifying symbol, such as a numeral or alphabetic letter, may be assigned to and marked upon each shelf, corresponding symbols being marked on the wheel 56 in such manner that, as each support member 12 reaches a predetermined position, such as a loading or dispensing station as at the opening 32, the symbol corresponding with such positioned member 12 will appear in the window 55.

The storage structure may also provide means for mounting an identifying chart 57 thereon in convenient position, such chart being adapted to contain a list of articles stored on each of the members 12, the article list being indexed to the shelf identifying symbols heretofore mentioned. Accordingly, access to or delivery of any listed article may be accomplished, or an article to be stored may be quickly loaded on its proper support member 12, merely by finding or placing the article on the list, then operating the handle 53 to bring the corresponding shelf identifying symbol into position in the window 55, to thus dispose the shelf, carrying, or selected to carry, such article at a delivery or loading station, whence the desired article may be promptly removed from, or loaded upon, its supporting shelf. Where separate loading and delivery stations are involved, separate corresponding loading and discharge index windows 55 may be provided.

If desired, suitable latch means 58 may be provided for latching or anchoring the crank 53 or the drive mechanism in a selected position, to thus hold the support members 12 in any selected position on the trackways. Such latch means 58 may conveniently be applied to the handle 53; or may be incorporated in the track structure to normally anchor the shelves 12 in a desired position and to release the same upon operation of suitable shelf release means; or such shelf anchoring means may reside inherently in the power multiplying factor of the gear train, through which the crank 53 is connected to drive the shaft 47.

As a further refinement, the crank 53 may, if desired, be provided with a pivoted crank handle 59 adapted to fold into the plane of the crank arm 53 when not in use. Such folding movement of the handle 59 may be utilized to actuate the latch means 58, if desired, to lock the crank 53 when the handle 59 is disposed in inoperative position, and to release the latch 58 when the handle is moved to operating position.

While the driving mechanism 52 may, of course, take any suitable or preferred form, it may, as shown more particularly in Fig. 11, conveniently comprise a mounting plate 60 adapted to be secured on and to form a part of the end frame structure 26. The mounting plate may be formed with an opening for a stub shaft 61 provided with dog clutch means 62 for coupling one end of the stub shaft 61 with the drive shaft 47 when the mechanism 52 is in mounted position on the end frame 26. The opposite end of the stub shaft 61 may carry gear means 63 splined thereon, including a large gear portion 64 and a preferably integral, and relatively smaller, gear portion 65. The plate may also carry a mounting pin 66 for turnably supporting gear means 67, comprising a relatively small gear portion 68 and a relatively larger, preferably integral gear portion 69, the gear portion 68 being in position drivingly engaged with the gear portion 64. The structure may also include a removable element 70, forming the cover 54, mounted on the plate 60 in position enclosing the power multiplying gear means, and said cover may be formed to turnably support a stub shaft 71, preferably in axial alinement with the shaft 61. Said stub shaft 71, at one end, may carry a gear 72 in position drivingly engaged with the gear portion 69. The opposite end of the stub shaft 71, outwardly of the cover 70, may carry the crank arm 53 and the attached manually operable handle 59. By turning the crank arm 53 through its handle, the shelf elements 12 may be moved on the tracks 14 through the power multiplication accomplished by the gear 72 driving the gear element 67, which, in turn, drives the gear element 64, said element 64 being coupled through the clutch 62 with the shaft 47, which, in turn, is drivingly connected with the driving elements 46, to thereby drive the flexible member 40 on which the carrying elements 12 are drivingly connected.

The gear portion 65 may be drivingly connected with an idler or transfer gear 75, suitably journaled on an axle pin 76 carried on the plate 60. The transfer gear 75 may, also, drivingly engage gear teeth 77 formed on a drum 78, journaled on the shaft 71 and enclosed within the casing 70, said drum 78 forming the index wheel 56 with indicia carrying surfaces in position, within the casing 54, for display through the window 55 formed in said casing. In addition to being journaled on the stem 71, the drum element 78 may be guided on the plate 60 by one or more idler gears 79 carried on mounting pins 80 on the plate 60, in position to engage the gear teeth 77 at stations angularly displaced from the place of engagement of said gears with the transfer gear 75.

By incorporating suitable ratios in the gears of the mechanism 52, any desired driving ratio may be provided. Ordinarily, the driving ratio should be such that, say, five turns of the handle 74, more or less, will result in shifting the driving members 40 a distance equal to the spacement of the members 12 on said members. The ratio provided by the gear elements 65, 75, and 77 should be such that the drum member 56 will make one complete turn on its axis as the driving members 40 make a complete circuit on the support members 41.

In order to latch the mechanism in adjusted position, the means 58 may be provided to secure the crank arm 53 against rotation with respect to the casing 70, or the latch means, if desired, may be applied in position in the structure to latch with any convenient or preferred portion of the driving mechanism, between and including the crank arm 53 and the driven support members 12. Such latch mechanism may comprise a shiftable latch element and suitable keeper means cooperatively mounted on the element to be latched and on an adjacent portion of the supporting frame. As shown in Fig. 11, the latch means may comprise keeper means, in the form of teeth 81, disposed circularly on the frame element 70 in position to engage a detent 82 on the arm 53, means being provided to cause the detent 82 to engage with the keeper means 81 to hold the mechanism in latched condition, and to retract the detent to release the mechanism for operative movement.

It is also desirable, though by no means essential, to mount the driving handle 59 on the crank arm 53 for pivotal movement so that the handle, when not in use, may be collapsed into the plane of the arm, whereby to eliminate the handle, as an undesirable projection, when the same is not in use. To this end, the handle 59 may be pivotally mounted on a pin 83 carried by the arm 53, so that the handle may be projected to the operating position shown in Fig. 11, or may be retracted to an inoperative position at right angles to the operative position. A manually operable latch 84, comprising a detent on the handle, may be provided in position to selectively engage keeper notches 85 on the arm 53, to retain the handle in either operating or in collapsed position. The detent means 82, also, may conveniently be formed as an integral tongue on the handle element in such position as to engage the keeper means 81 when the handle is in the inoperative position shown in Fig. 11, the detent 82 being retracted from the keeper means 81 when the handle is in operative position.

If desired, as shown in Fig. 13, electrical means may be provided for the operation of the mechanism. This is especially desirable where relatively large storage equipment is involved, or where the equipment is provided for the storage of heavy articles. In this connection, it is, of course, possible to provide an electric motor connected directly with the shaft 47, or the electric motor may be connected as on the stub shaft 71 to drive the mechanism through a power multiplying gear train similar to the gear mechanism 52. Where an electrical drive is employed, the means 58 for latching the structure against movement preferably comprises an electrically retractable detent means cooperatively associated with keeper means formed on one or other or all of the driving members 41 and 46, as by mounting the electrically actuated detent means on the end frames 26 in position normally engaging the keeper means on the members 41 and 46, the electrically actuated detent means being retractable from latching position when electrically energized. Obviously, the electrically actuated detent means may be applied to latch any other movable portion of the driving mechanism, as convenience demands.

As shown in Fig. 13, the electrical system may comprise an electric motor 86 drivingly connected with the storage apparatus and powered from a suitable source 87 of electrical power, through a suitable power delivery circuit, R. The circuit, R, preferably includes disconnecting switch means 88, fuse means 89, or other protective equipment, and a motor control switch 90. The control switch 90 preferably comprises a normally open switch having an operating solenoid 91 for closing the switch and holding the same closed when electrically energized. To control the operation of the motor 86, the solenoid 91 may be included in a circuit, Z, extending from one side of the power circuit, R, in series through the solenoid 91, and control switch means 92, to the other side of the power line. The circuit, Z, preferably also includes, in series therein, a starting switch 93, a safety switch 94, and solenoid means 95 for retracting the mechanism latching means, heretofore described, when electrically energized.

The control switch means 92 may comprise a set, J, of normally closed switches 96, connected in parallel relationship, in the circuit Z, and a set, C, of normally open selector switches 97, each of the normally closed switches of the switch set 96 being in series with a corresponding, normally open switch 97. Preferably, there are as many switches 96 provided as there are members 12 to be controlled, each switch corresponding to one of the support members 12. The normally open switches 97 may conveniently comprise a rotary switch assembly embodying circularly arranged, stationary contact elements, each of which is electrically connected with a corresponding switch 96 of the switch set, J, and a common movable blade which may be adjusted to make electrical engagement with any selected one of the stationary contacts of the switch set 97. Thus, the selector switch set may be operated to select and to controllingly connect any desired one of the switches 96 in the circuit Z.

The switches 96 may likewise be circularly arranged in position to be each successively opened as the corresponding support member 12 reaches a desired position on the track system, such as a loading or discharge station, at which it may be desired to stop the member 12. To this end, the switches 96 may be mounted in any suitable or convenient position to be operated in the manner specified. They may, for example, be mounted in a row in the main structure in position each to be opened by an actuating projection on the corresponding shelf or member 12, the projection on each shelf being offset with respect to the corresponding projections on all other shelves, so that the projection on one shelf will operate only one switch. Alternately, the switches 96 may be mounted in circular, spaced-apart relationship in the casing 70 in position to be engaged and opened successively by an actuating projection, F, on the wheel 78, the actuating projection and the switches being so mounted as to open each switch as its corresponding shelf member 12 reaches the position on the track system where it is desired to stop operation of the shelf moving mechanism.

The starting switch 93, if used, may comprise a normally open switch having a holding solenoid 98 connected in the circuit Z in such fashion as to hold the switch closed so long as electrical current is flowing in the circuit, the switch 93 opening after closure whenever the circuit is opened by the opening of a selected switch of the set 96, or by the opening of the safety switch 94. If desired, the start switch 93 may be provided with a stop button 99 for manually opening the switch against the influence of the solenoid 98, in the event that it may be desired to stop operation of the mechanism at any time, by de-energizing the solenoid 91.

The safety switch 94 may comprise a normally closed switch element having an actuating solenoid 100 adapted for connection in series in the power supply line, R, in order to open the normally closed switch 94 in the event that overload conditions occur in the power line, as may occur if articles stored on the support members 12 should become displaced therefrom and occupy a position interfering with the free operation of the mechanism. Under such conditions, the resulting overload on the motor and in the power line will serve to open the switch 94 and stop the motor.

It will be seen from the foregoing that the selector switch means C may be operated to select and connect any one of the switches 96 in the control circuit. By the closing of the starting switch 93, the circuit Z will be completed through the solenoid 91, the solenoid means 95, the selected normally closed switch 96, and its connected element of the selector switch 97, thence through the closed starting switch and the normally closed safety switch 94. The circuit having thus been completed, the starting switch will be retained in closed position by the holding solenoid 98 and will energize the solenoid 91 and the solenoid means 95. Operation of the solenoid means 95 will release the mechanism latch 58. At the same time, the solenoid 91 will operate to close the switch 90 and set the motor 86 in operation to shift the carrier elements 12 along the guide track means, whereby to present the carrier elements 12 successively at the loading and dispensing station or stations. The motor 86 may continue to function until the shelf member 12, corresponding to the selected switch 96, reaches a desired stopping position, such as a loading or discharge station, at which moment the selected switch 96 will open, by operation of the actuating projection, F. Interruption of the circuit Z in such fashion will de-energize the solenoids 91, 95, and 98, stop operation of the motor, latch the mechanism, and return the start switch 93 to open position ready for a repeat performance upon operation of the selector switch means C to select a different shelf controlling switch 96.

If the switch 93 be closed when the selector switch C is in position selecting a shelf that is already in loading or dispensing position, the corresponding selected switch 96 will be open and the circuit Z, hence, can not be completed. The mechanism, consequently, will remain stationary with the selected shelf in desired position. If, during the operation of the motor, it be desired to stop the mechanism, before a selected shelf has reached the desired stopping position, the stop button 99 may be operated to open the switch 93 and thereby de-energize the solenoids 91, 95 and 98. Thereupon, a new selection may be made or the original selection may be allowed to stand, and the new or original selection may be ultimately accomplished by restarting the motor by closing the switch 93. In the event that the mechanism becomes jammed, resulting in an overload condition in the power line, the switch 94 may open, as heretofore described, in order to prevent the apparatus from damaging itself by continued operation of the motor 86.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, and an arm on each of said support members extending to and connected with said driving element, said tracks being intersected to form gaps therein adjacent said cross-over stations to permit said arms to pass across said intersected tracks through said gaps.

2. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, a pair of spaced apart wheel elements supporting and forming driving connection with said driving element, a shaft for supporting each wheel, bearings for said shaft rigidly interconnected with said track means adjacent said cross-over stations, and an arm on each of said support members extending to and connected with said driving element, said tracks being intersected to form gaps therein adjacent said cross-over stations to permit said arms to pass across said intersected tracks through said gaps.

3. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless driving element, latch means operable to hold said members against movement in said path when said driving means is inactive, and means operable in response to activation of said driving means to release said latch means.

4. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, power transmission means drivingly connected with said endless driving element, motive means drivingly connected with said transmission means, latch means to lock the transmission means against movement when said motive means is inactive, and means for releasing said latch means when the motive means is in operation.

5. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members each having a pair of spaced track engaging elements mounted thereon in position each to engage and travel along its corresponding one of said circuitous tracks for holding the members on the track means against turning movement with respect to the support structure, means for moving said support members in a circuitous path along said tracks comprising an endless driving element mounted in offset parallel relation with respect to said tracks, and an arm on each of said support members extending to and connected with said driving element, said tracks being intersected to form gaps therein adjacent said cross-over stations to permit said arms to pass across said intersected tracks through said gaps.

6. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members each having a pair of spaced track engaging elements mounted thereon in position each to engage and travel along its corresponding one of said circuitous tracks, for holding the members on the track means against turning movement with respect to the support structure, means for moving said support members in a circuitous path along said tracks comprising an endless driving element mounted in offset parallel relation with respect to said tracks, and an arm on each of said support members extending to and connected with said driving element and driven thereby in a circulating path corresponding with the circuitous path in which the support members are guided by said tracks, said tracks being disposed between said support members and said endless driving element and being intersected to form gaps therein adjacent said cross-over stations to permit said arms to pass across said tracks at the points of intersection thereof with the offset circulating path of said arms.

7. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, and power conversion means connected with said shaft for driving the same.

8. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, and power conversion means comprising a motor connected with said shaft for driving the same.

9. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, power conversion gear means drivingly connected with said shaft, and means for applying driving power to said gear means.

10. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, power conversion means comprising a turnable gear, manually operable means for turning said gear, and geared power transmission means drivingly connecting the turnable gear with said shaft.

11. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, power conversion means comprising a turnable member drivingly connected with said shaft, and releasable latch means for securing the turnable member normally against turning movement to thereby secure said endless element, the support members connected therewith and said driving means against movement in the support structure.

12. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over station to permit said arms to pass across said intersected tracks through said gaps, driving means for said endless element comprising a turnable shaft drivingly connected with said endless element, power conversion means comprising a manually turnable member drivingly connected with said shaft, and releasable latch means for securing the manually turnable member against turning movement to thereby secure said endless element, the support members connected therewith and said driving means against movement in the support structure.

13. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, power conversion means comprising a manually operable crank drivingly connected with said shaft, said crank having a handle normally urged toward retracted inoperative position on said crank and shiftable to a projected operating position for manual crank turning purposes, and latch means controlled by said handle for securing the crank against turning movement, when the handle is in retracted position, and for releasing the crank for turning movement, when the handle is in projected position.

14. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, power conversion means to drivingly turn said shaft, an indicator, and means to drive the same in synchronism with said endless element to indicate the relative position of the support members in said structure.

15. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being intersected to form gaps therein adjacent said cross-over stations to permit said arms to pass across said intersected tracks through said gaps, driving means for said endless element comprising a turnable shaft drivingly connected with said endless element, power conversion means for driving said shaft, a turnable drum forming an indicator, and geared means for driving said drum in synchronism with said shaft to show the relative position of the support members in said structure.

16. Storage equipment comprising means forming a support structure, circuitous guide track means on said structure and comprising a pair of overlappingly offset circuitous tracks having like configuration and like portions in equally spaced apart relationship, said tracks mutually crossing each other at a pair of spaced cross-over stations, movable support members and spaced track engaging elements on each of said members for holding the members on the track means against turning movement with respect to the support structure, means for moving said support members in a circuitous path along said tracks comprising an endless driving element mounted in offset parallel relation with respect to said tracks, an arm on each of said support members extending to and connected with said driving element, said tracks being interested to form gaps therein adjacent said cross-over stations to permit said arms to pass across said intersected tracks through said gaps, driving means for said endless element comprising a turnable shaft drivingly connected with said endless element, power conversion gear means drivingly connected with said shaft, means for applying driving power to said gear means, and a turnable indicator member drivingly connected with said gear means for movement in synchronism with the driven movement of said endless element.

17. Storage equipment comprising means forming a support structure, circuitous guide track means mounted on said support structure, movable support members and track engaging elements on said members for mounting the same for movement in spaced relationship in a circuitous path on said track means, whereby said members may travel said path in endless succession, past a stop station, driving means operable to so move the members in said path, means to start the driving means in operation and to stop the same, as a selected one of said support members reaches said stop station, comprising a start and stop control device, a stop device for each member and operable as its corresponding support member reaches said stop station, selector means for operatively connecting any selected one of said stop devices with said control device to actuate the same to stop said driving means, and means to operate said control device to start said driving means in operation.

18. Storage equipment comprising means forming a support structure, circuitous guide track means mounted on said support structure, movable support members and track engaging elements on said members for mounting the same for movement in spaced relationship in a circuitous path on said track means, whereby said members may travel said path in endless succession, past a stop station, driving means operable to so move the members in said path, a relay switch for starting and stopping said driving means, a stop switch for each support member and operable as its corresponding support member reaches said stop station, selector switch means to operatively connect any selected one of said stop switches with said relay switch to actuate the same to stop said driving means, and starting switch means to actuate said relay switch to start said driving means in operation.

19. Storage equipment comprising means forming a support structure, circuitous guide track means mounted on said support structure and comprising a pair of overlapping offset circuitous tracks having like circuitous configuration and like portions in equally spaced apart relationship, movable support members each having a pair of spaced apart track engaging elements mounted thereon, each in position to engage and travel along its corresponding one of said circuitous tracks for mounting the support members for movement in spaced apart relationship in a circuitous path on said track means, whereby said members may travel said path in endless succession, past a stop station, driving means operable to so move the members in said path, said driving means comprising an endless flexible member movable in a path in relatively offset parallel relation with the said circuitous tracks, said support members each having a driving arm connected to said flexible member and driven thereby in a circulating path corresponding with the circuitous path in which the support members are guided by said tracks, control means to start the driving means in operation and to stop the same, as a selected one of said support members reaches said stop station, said control means comprising a start and stop control device, a stop device for each member operable as its corresponding support member reaches said stop station, selector means for operatively connecting any selected one of said stop devices with said control device to actuate the same to stop said driving means, and means to operate said control device to start said driving means in operation.

20. Storage equipment comprising spaced end frames, means to support said frames in spaced relation, track means on each of said end frames comprising a pair of overlapping circuitous tracks of identical configuration, forming a track pair on each of said end frames, each track of a track pair having spaced straight sides and curved end portions connecting said sides to form an endless track, said endless tracks lying in a common plane and overlapping and mutually intersecting at common intersection points on said curved portions, a plurality of shelf members extending between and supported on the track pairs on said end frames, each shelf member having a pair of track engaging rollers at each of its opposite ends, each pair of rollers being spaced apart in position so that each may engage and ride on a corresponding one of the tracks of a said track pair, a flexible endless member drivingly engaging and supported on spaced wheels on each of said end frames, said flexible members lying in planes outwardly of and parallel to the planes of said track pairs, said shelf members each having driving pins at the opposite ends thereof extending to and connected on said flexible members, whereby said members are supported in spaced relation on said flexible members in position to move in endless succession in a circuitous path defined by said track means, the tracks of said track pairs having broken out portions, adjacent said common intersection points, to allow said driving pins to cross said tracks at said broken out portions, shafts extending between and journaled in bearings on said spaced end frames and in said track pairs adjacent the cut out portions thereof, said shafts carrying said wheels and serving to brace and rigidify said end frames and said track pairs thereon, motive means for driving said shaft to move said endless members and thus to shift the connected shelf members in said path.

RICHARD M. ZOOK.

REFERENCES CITED

The following references are of record in the file of this patent:

UNITED STATES PATENTS

| Number | Name | Date |
| --- | --- | --- |
| 719,890 | Shaw | Feb. 3, 1903 |
| 962,749 | Davis | June 28, 1910 |
| 974,663 | Harris | Nov. 1, 1910 |
| 992,299 | Vickers | May 16, 1911 |
| 1,264,602 | Bezoier | Apr. 30, 1918 |
| 1,643,224 | Shelton | Sept. 20, 1927 |
| 1,841,530 | Geiger | Jan. 19, 1932 |
| 2,214,807 | Buckley | Sept. 17, 1940 |

FOREIGN PATENTS

| Number | Country | Date |
| --- | --- | --- |
| 288,099 | Germany | Oct. 19, 1915 |